(12) United States Patent
Tang et al.

(10) Patent No.: US 12,027,719 B2
(45) Date of Patent: Jul. 2, 2024

(54) BATTERY MODULE

(71) Applicant: CONTEMPORARY AMPEREX TECHNOLOGY CO., LIMITED, Fujian (CN)

(72) Inventors: Yu Tang, Fujian (CN); Linggang Zhou, Fujian (CN); Ziyuan Li, Fujian (CN); Peng Wang, Fujian (CN); Kaijie You, Fujian (CN); Xingdi Chen, Fujian (CN)

(73) Assignee: CONTEMPORARY AMPEREX TECHNOLOGY CO., LIMITED, Fujian (CN)

( * ) Notice: Subject to any disclaimer, the term of this patent is extended or adjusted under 35 U.S.C. 154(b) by 589 days.

(21) Appl. No.: 17/355,761

(22) Filed: Jun. 23, 2021

(65) Prior Publication Data

US 2021/0320370 A1    Oct. 14, 2021

Related U.S. Application Data

(63) Continuation of application No. PCT/CN2019/079230, filed on Mar. 22, 2019.

(30) Foreign Application Priority Data

Dec. 28, 2018 (CN) .......................... 201822239535.0

(51) Int. Cl.
*H01M 50/262* (2021.01)
*H01M 10/04* (2006.01)
(Continued)

(52) U.S. Cl.
CPC ..... *H01M 50/262* (2021.01); *H01M 10/0413* (2013.01); *H01M 50/209* (2021.01);
(Continued)

(58) Field of Classification Search
CPC .. H01M 50/262; H01M 50/50; H01M 50/227; H01M 50/502; H01M 50/209; H01M 50/264; H01M 10/0413
See application file for complete search history.

(56) References Cited

U.S. PATENT DOCUMENTS

2010/0247996 A1    9/2010    Ijaz et al.
2010/0247997 A1    9/2010    Hostler et al.
(Continued)

FOREIGN PATENT DOCUMENTS

CN    206947426 U    1/2018
CN    207818733 U    9/2018
(Continued)

OTHER PUBLICATIONS

International Search Report dated Sep. 4, 2019 issued in PCT/CN2019/079230.

*Primary Examiner* — Jane J Rhee
(74) *Attorney, Agent, or Firm* — Scully, Scott, Murphy & Presser, P.C.

(57) ABSTRACT

The present application provides a battery module, which includes a plurality of batteries, an end plate and an output electrode connecting sheet. The plurality of batteries are arranged in a longitudinal direction. The end plate has: a main body portion, located on one side of the plurality of batteries in the longitudinal direction; and an extension portion, formed on the main body portion and extending in the longitudinal direction away from the batteries. The output electrode connecting sheet has: a first connecting portion, connected to a corresponding battery; and a second connecting portion, connected to one end of the first connecting portion and fixed to the extension portion of the end plate.

8 Claims, 4 Drawing Sheets

(51) Int. Cl.
*H01M 50/209* (2021.01)
*H01M 50/227* (2021.01)
*H01M 50/264* (2021.01)
*H01M 50/296* (2021.01)
*H01M 50/50* (2021.01)
*H01M 50/502* (2021.01)

(52) U.S. Cl.
CPC ....... *H01M 50/227* (2021.01); *H01M 50/264* (2021.01); *H01M 50/296* (2021.01); *H01M 50/50* (2021.01); *H01M 50/502* (2021.01)

(56) References Cited

U.S. PATENT DOCUMENTS

| | | |
|---|---|---|
| 2010/0247998 A1 | 9/2010 | Hostler et al. |
| 2010/0247999 A1 | 9/2010 | Ijaz et al. |
| 2010/0248010 A1 | 9/2010 | Butt et al. |
| 2012/0196170 A1 | 8/2012 | Ijaz et al. |
| 2014/0349164 A1 | 11/2014 | Park et al. |

FOREIGN PATENT DOCUMENTS

| | | |
|---|---|---|
| CN | 208014772 U | 10/2018 |
| EP | 2811545 A2 | 12/2014 |
| JP | 2014203745 A | 10/2014 |

BATTERY MODULE

CROSS-REFERENCE TO RELATED APPLICATIONS

This application is a continuation of International Application No. PCT/CN2019/079230, filed on Mar. 22, 2019, which claims priority to Chinese Patent Application No. 201822239535.0, filed on Dec. 28, 2018. The disclosures of the aforementioned applications are hereby incorporated by reference in their entireties.

TECHNICAL FIELD

The present application relates to the field of battery technologies, and in particular, to a battery module.

BACKGROUND

A battery module usually includes a plurality of batteries, end plates disposed on two ends of the plurality of batteries, a plurality of electrical connecting sheets connecting the plurality of batteries in series and/or parallel, and an output electrode connecting sheet electrically connecting the plurality of batteries to an external device. At present, to fixedly mount the output electrode connecting sheet, an output electrode base usually needs to be mounted on the end plate, and then the output electrode connecting sheet is fixedly mounted through the output electrode base. Since the output electrode base and the end plate are two sets of independent components, they need cooperation for mounting, and a mounting structure and a guiding structure that are mated with the output electrode base need to be added on the end plate, manufacturing and assembly processes are not only increased, assembling efficiency of the battery module is reduced, but also weight of the battery module is creased (more components), and energy density of the battery module is reduced.

SUMMARY

In view of problems in the background, the objective of the present application is to provide a battery module, which reduces the number of parts of the battery module, simplifies manufacturing and mounting processes, and improves assembling efficiency of the battery module.

To achieve the foregoing objective, the present application provides a battery module, which includes a plurality of batteries, an end plate and an output electrode connecting sheet. The plurality of batteries are arranged in a longitudinal direction. The end plate has: a main body portion, located on one side of the plurality of batteries in the longitudinal direction; and an extension portion formed on the main body portion and extending in the longitudinal direction away from the batteries. The output electrode connecting sheet has: a first connecting portion, connected to a corresponding battery; and a second connecting portion, connected to one end of the first connecting portion and fixed to the extension portion of the end plate.

The second connecting portion extends downward in an up-down direction and is located on an outer side of the extension portion in the longitudinal direction.

The second connecting portion of the output electrode connecting sheet is fixed to the extension portion of the end plate through a fastening assembly.

The fastening assembly includes: a connecting member; and a mating member, mated with the connecting member to fix the second connecting portion of the output electrode connecting sheet to the extension portion of the end plate.

The mating member is embedded in the extension portion of the end plate, and the mating member is provided with a connecting hole. A head of the connecting member is located on an outer side of the second connecting portion of the output electrode connecting sheet in the longitudinal direction, and a tail of the connecting member is fixedly connected to the mating member through the connecting hole.

The mating member protrudes from the extension portion in the longitudinal direction, so that the second connecting portion of the output electrode connecting sheet abuts on an end face of the mating member.

An outer peripheral face of the mating member is provided with protrusions and/or grooves engaged with the extension portion.

The extension portion is provided with a restraint groove, a head of the connecting member is fixed in the restraint groove, and a tail of the connecting member protrudes from the second connecting portion of the output electrode connecting sheet to be fixedly connected to the mating member.

The connecting member is a hexagon head bolt, and an inner peripheral face of the restraint groove is formed into a hexagon head shape.

The battery module further includes: a current collecting plate, fixedly connected to the second connecting portion of the output electrode connecting sheet through the fastening assembly.

The beneficial effects of the present application are as follows:

as a second connecting portion of an output electrode connecting sheet is directly fixed on an extension portion of an end plate (that is, the extension portion provides a support force for fixing of the output electrode connecting sheet), there is no need to additionally provide an output electrode base for mounting the output electrode connecting sheet, thereby reducing the number of parts of a battery module, simplifying manufacturing and mounting processes, and improving assembling efficiency of the battery module. Meanwhile, due to the small number of parts of the battery module, weight of the battery module is reduced, and energy density of the battery module is increased.

Reference signs are explained as follows:

| | |
|---|---|
| 1 | battery |
| 2 | end plate |
| 21 | main body portion |
| 22 | extension portion |
| 221 | restraint groove |

| | |
|---|---|
| 3 | output electrode connecting sheet |
| 31 | first connecting portion |
| 32 | second connecting portion |
| 4 | fastening assembly |
| 41 | connecting member |
| 411 | head |
| 412 | tail |
| 42 | mating member |
| 421 | connecting hole |
| 422 | end face |
| 423 | protrusion |
| 424 | groove |
| 5 | current collecting plate |
| X | transverse direction |
| Y | longitudinal direction |
| Z | up-down direction |

DESCRIPTION OF EMBODIMENTS

To make the objectives, technical solutions, and advantages of the present application clearer and more comprehensible, the present application will be further described below in detail with reference to the accompanying drawings and embodiments. It should be understood that the specific embodiments described herein are merely used to explain the present application, but are not intended to limit the present application.

In the description of the present application, unless otherwise specified and limited explicitly, the terms "first" and "second" are merely intended for a purpose of description, and shall not be understood as an indication or implication of relative importance. The term "a plurality of" refers to two or more than two. Unless otherwise specified or illustrated, the term "connection" and "fix" should be understood broadly, for example, the "connection" may either be a fixed connection, or a detachable connection, or an integrated connection, or an electrical connection, or a signal connection; and the "connection" may either be a direct connection, or an indirect connection through an intermediary. Those of ordinary skill in the art may appreciate the specific meanings of the foregoing terms in the present application according to specific conditions.

In the description of the specification, it should be understood that the terms representing directions such as "up", "down", "head" and "tail" described in the embodiments of the present application are described from the angles shown in the accompanying drawings, and should not be understood as limitation on the embodiments of the present application. In addition, in the context, it should also be understood that when it is mentioned that one element is connected "on" or "under" another element, it can not only be directly connected "on" or "under" another element, but also be indirectly connected "on" or "under" another element through an intermediate element. The present application will be further described below in detail through the specific embodiments with reference to the accompanying drawings.

Figure 1:
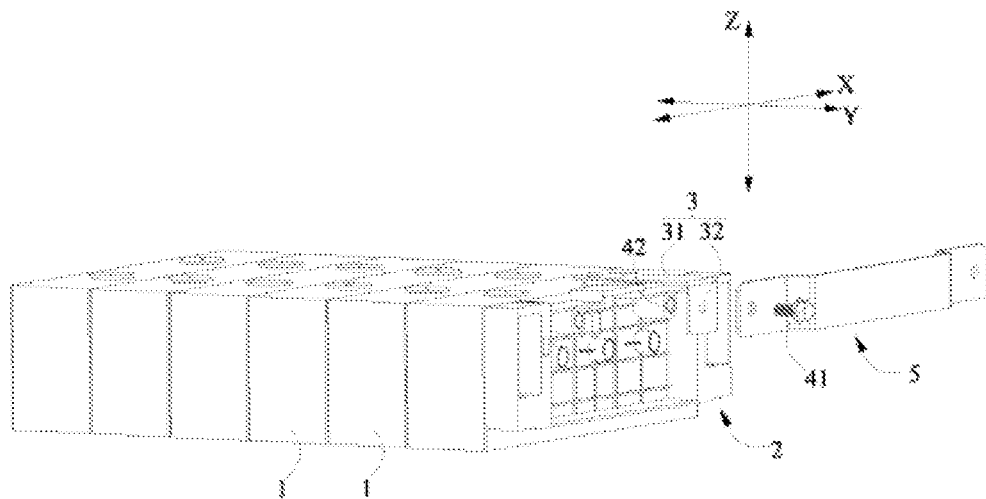
FIG. 1 is a perspective exploded view of a battery module of the present application in an embodiment.
Figure 2:
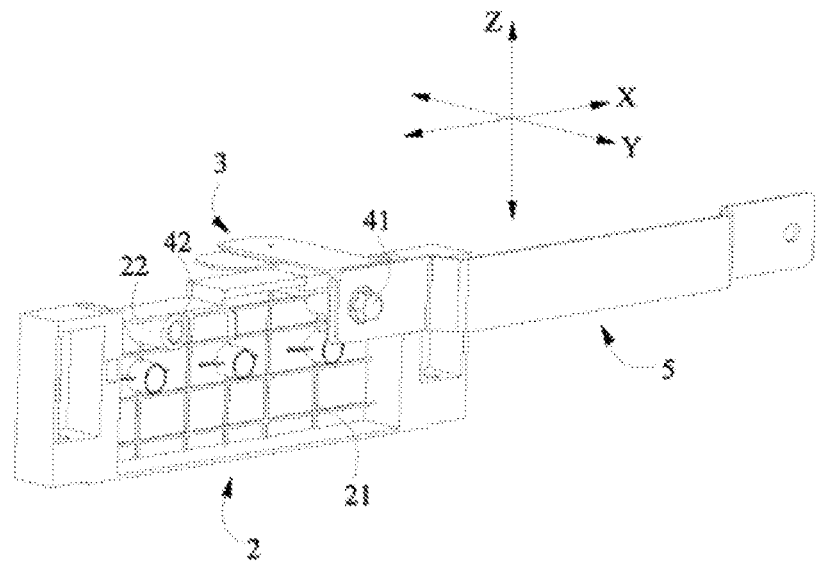
FIG. 2 is an assembly view of FIG. 1, where batteries are omitted.
Figure 3:
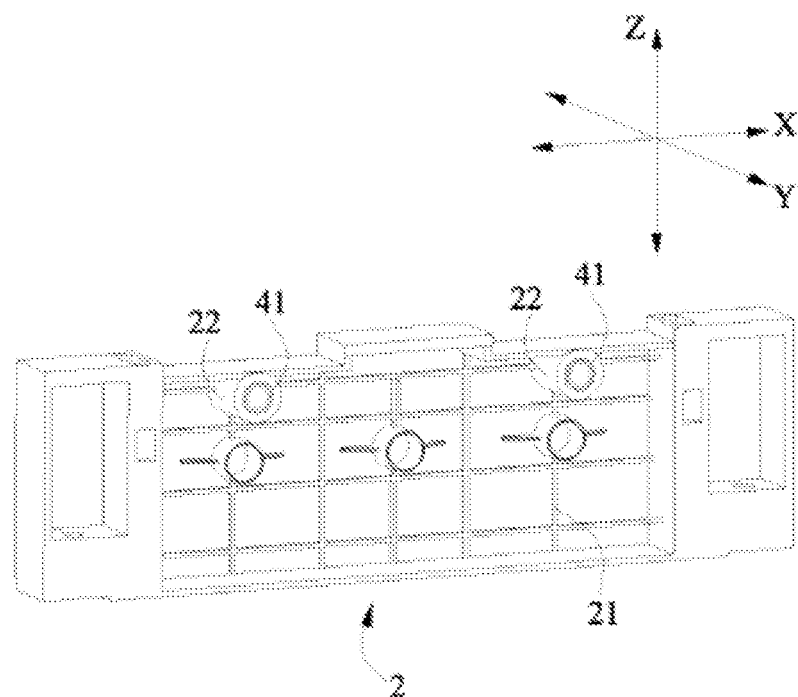
FIG. 3 is a schematic mounting view of a mating member and an end plate in FIG. 1.
Figure 5:
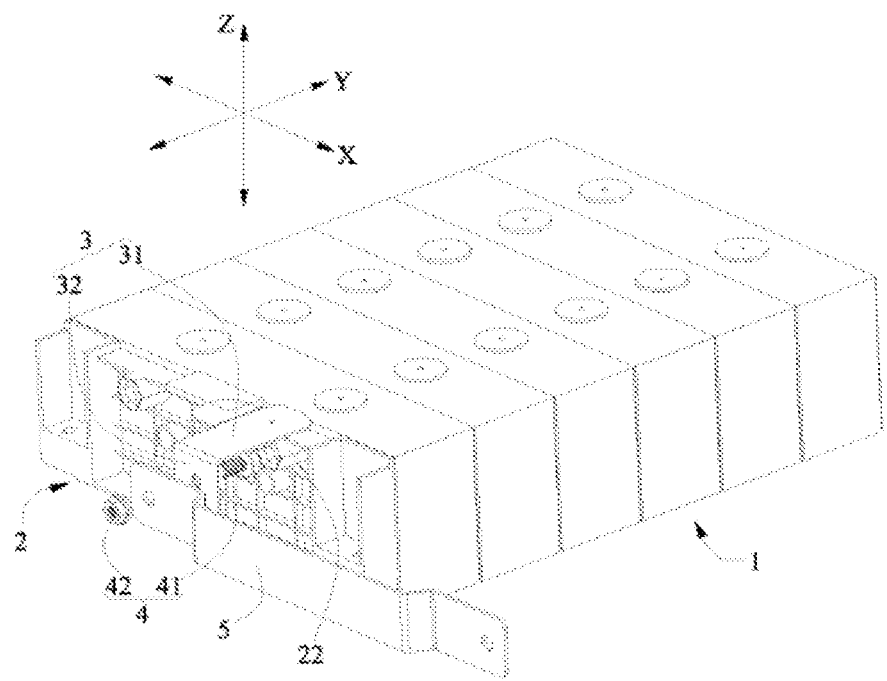
FIG. 5 is a perspective exploded view of a battery module of the present application in another embodiment.

With reference to FIG. 1 and FIG. 5, a battery module of the present application includes a plurality of batteries 1, an end plate 2, an output electrode connecting sheet 3, a fastening assembly 4 and a current collecting plate 5.

With reference to FIG. 1 and FIG. 5, the plurality of batteries 1 are arranged in a longitudinal direction Y, and electrically connected together through electrical connecting sheets (not shown).

With reference to FIG. 1 to FIG. 7, the end plate 2 has: a main body portion 21, located on one side of the plurality of batteries 1 in the longitudinal direction Y; and an extension portion 22, formed on the main body portion 21 and extending in the longitudinal direction Y away from the batteries 1. The number of end plates 2 is two, and the two end plates 2 are respectively located on two sides of the plurality of batteries 1 in the longitudinal direction Y and fixedly clamp the plurality of batteries 1 together.

The end plate 2 may be injection molded with insulating materials (such as plastic). Preferably, the end plate 2 is made of polyamide and glass fibers. Based on the material of the end plate 2, the insulation requirement is satisfied between the end plate 2 and the battery 1, and thus there is no need to additionally provide an insulating film between the end plate 2 and the battery 1 when the battery module is assembled, thereby simplifying assembly processes of the battery module.

The main body portion 21 of the end plate 2 may be formed into an interlaced truss structure, and the extension portion 22 of the end plate 2 may be formed into a cylindrical structure. The end plate 2 in such a structure not only saves materials, but also improves strength of the end plate 2.

The output electrode connecting sheet 3 electrically connects the plurality of batteries 1 to an external device (such as another battery module) through the current collecting plate 5. Specifically, with reference to FIG. 1, FIG. 2, FIG. 5 and FIG. 6, the output electrode connecting sheet 3 has: a first connecting portion 31, connected to a corresponding battery 1; and a second connecting portion 32, connected to one end of the first connecting portion 31 and fixed to the extension portion 22 of the end plate 2 through the fastening assembly 4, and the second connecting portion 32 is used to be connected to the external device.

As the second connecting portion 32 of the output electrode connecting sheet 3 is directly fixed on the extension portion 22 of the end plate 2 (that is, the extension portion 22 provides a support force for fixing of the output electrode connecting sheet 3), there is no need to additionally provide an output electrode base for mounting the output electrode connecting sheet 3, thereby reducing the number of parts of the battery module, simplifying manufacturing and mounting processes, and improving assembling efficiency of the battery module. Meanwhile, due to the small number of parts of the battery module, weight of the battery module is reduced, and energy density of the battery module is increased.

With reference to FIG. 1, FIG. 2, FIG. 5 and FIG. 6, the second connecting portion 32 of the output electrode connecting sheet 3 may extend downward in an up-down direction Z and is located on an outer side of the extension portion 22 in the longitudinal direction Y. In other words, the output electrode connecting sheet 3 may be formed into an L-shaped structure.

Since the second connecting portion 32 is mounted on a side face of the end plate 2 in the longitudinal direction Y, it can make full use of space outside the end plate 2, thereby effectively reducing space occupation of the output electrode connecting sheet 3 in the up-down direction Z, and improving the energy density of the battery module.

The number of output electrode connecting sheets 3 may be two. In an embodiment, the two output electrode connecting sheets 3 are located on the same end of the plurality of batteries 1 in the longitudinal direction Y, the extension portion 22 of one of the end plates 2 is the same in number as the output electrode connecting sheets 3, and the second connecting portion 32 of each output electrode connecting sheet 3 is fixed to a corresponding extension portion 22 of the end plate 2. In another embodiment, the two output electrode connecting sheets 3 are respectively located on two ends of the plurality of batteries 1 in the longitudinal direction Y, and the second connecting portion 32 of each output electrode connecting sheet 3 is fixed to an extension portion 22 of a corresponding end plate 2.

With reference to FIG. 1, FIG. 2, FIG. 5 and FIG. 6, the fastening assembly 4 includes: a connecting member 41; and a mating member 42, mated with the connecting member 41 to fix the second connecting portion 32 of the output electrode connecting sheet 3 to the extension portion 22 of the end plate 2. Specifically, the connecting member 41 may be a bolt, and the mating member 42 may be a nut.

In an embodiment, with reference to FIG. 1 to FIG. 4, the mating member 42 is embedded in the extension portion 22 of the end plate 2 (that is, injection materials of the end plate 2 is molded by injection molding with the mating member 42), and the mating member 42 is provided with a connecting hole 421. A head 411 of the connecting member 41 is located on an outer side of the second connecting portion 32 of the output electrode connecting sheet 3 in the longitudinal direction Y, and a tail 412 of the connecting member 41 is fixedly connected to the mating member 42 through the connecting hole 421.

Figure 4:
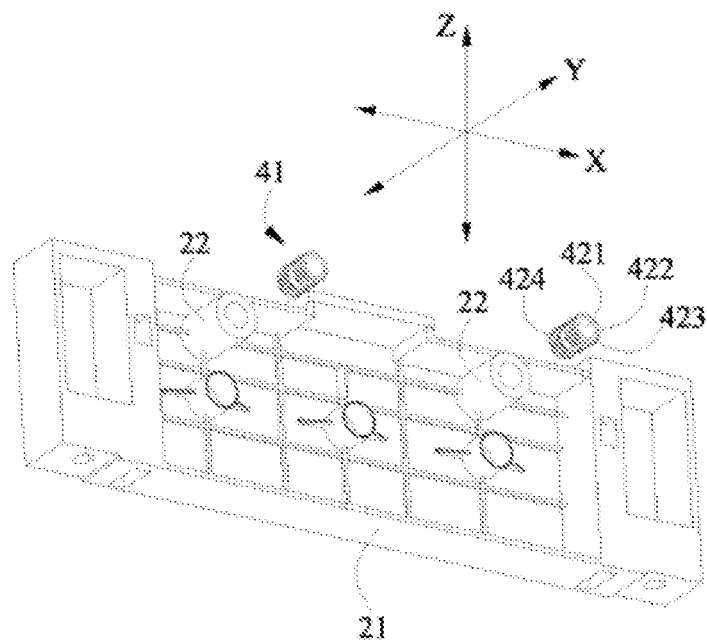
FIG. 4 is an exploded view of FIG. 3.

In order to improve connection strength between the mating member 42 and the end plate 2 during the molding process, an outer peripheral face of the mating member 42 may be provided with protrusions 423 and/or grooves 424 engaged with the extension portion 22 of the end plate 2, as shown in FIG. 4. Specifically, the protrusions 423 may be formed into a sawtooth structure.

Since the material of the mating member 42 is metal, and the material of the end plate 2 is plastic, during the connection process of the connecting member 41 and the mating member 42, in order to prevent the second connecting portion 32 of the output electrode connecting sheet 3 from directly abutting against and squeezing an end face of the extension portion 22 to cause damage to the end plate 2, preferably, the mating member 42 is provided to protrude from the extension portion 22 in the longitudinal direction Y. In this case, the second connecting portion 32 of the output electrode connecting sheet 3 directly abuts on an end face 422 of the mating member 42. Specifically, the end face 422 of the mating member 42 may exceed the end face of the extension portion 22 by 0.5 mm.

Figure 6:
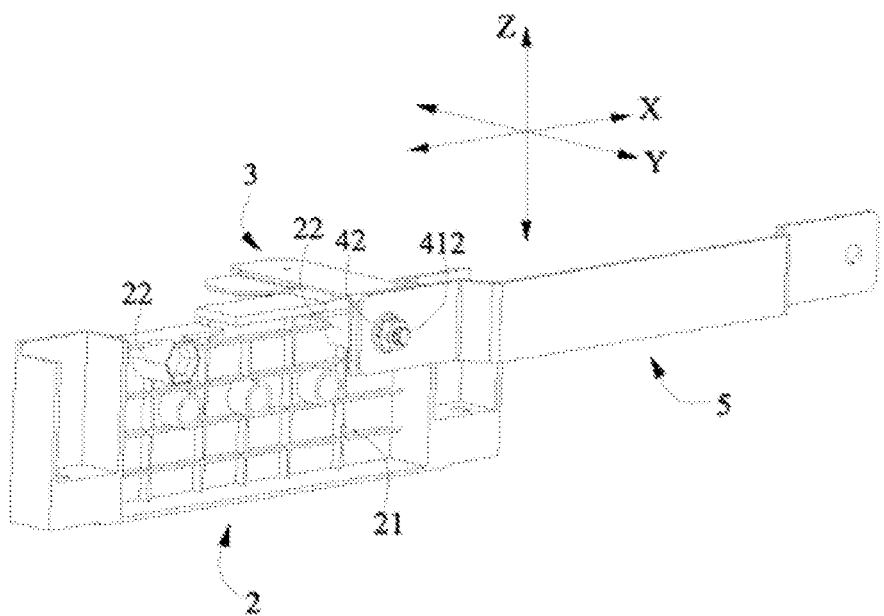
FIG. 6 is an assembly view of FIG. 5, where batteries are omitted.
Figure 7:
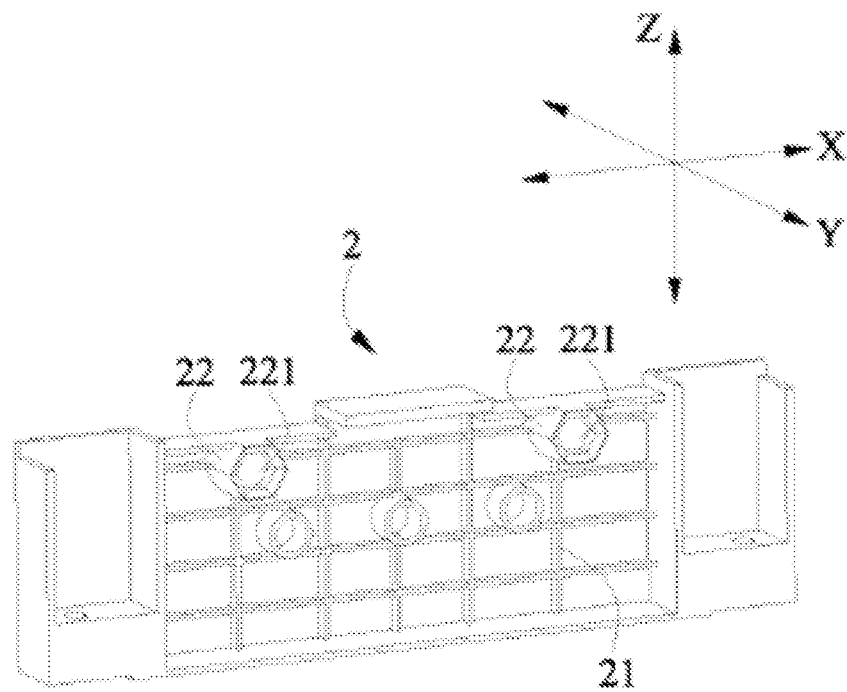
FIG. 7 is a perspective view of an end plate in FIG. 5.
Figure 8:
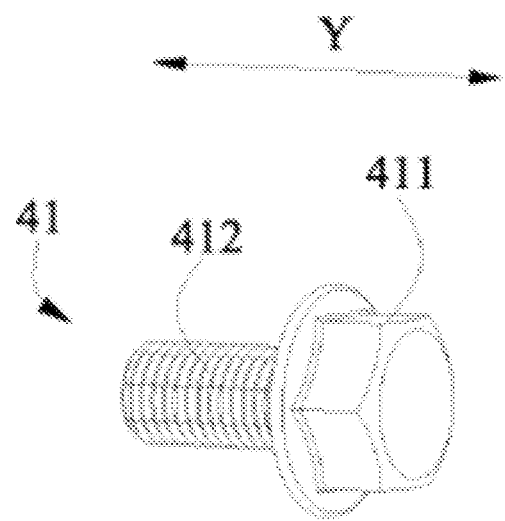
FIG. 8 is a perspective view of a connecting member.

In another embodiment, with reference to FIG. 5 to FIG. 7, the extension portion 22 of the end plate 2 is provided with a restraint groove 221. A head 411 of the connecting member 41 is fixed in the restraint groove 221, and a tail 412 of the connecting member 41 protrudes from the second connecting portion 32 of the output electrode connecting sheet 3 to be fixedly connected to the mating member 42.

During the connection process of the mating member 42 and the connecting member 41, since the restraint groove 221 restrains rotation of the connecting member 41 in an axial direction, the mating member 42 can be smoothly mated with the connecting member 41 to fix the second connecting portion 32 of the output electrode connecting sheet 3 to the extension portion 22 of the end plate 2. Preferably, the connecting member 41 is a hexagon head bolt, and an inner peripheral face of the restraint groove 221 is formed into a hexagon head shape.

With reference to FIG. 1, FIG. 2, FIG. 5 and FIG. 6, the current collecting plate 5 is fixedly connected to the second connecting portion 32 of the output electrode connecting sheet 3 through the fastening assembly 4.

What is claimed is:
1. A battery module, comprising:
   a plurality of batteries, arranged in a longitudinal direction;
   an end plate, comprising: a main body portion, located on one side of the plurality of batteries in the longitudinal direction; and an extension portion, formed on the main body portion and extending in the longitudinal direction away from the batteries; and
   an output electrode connecting sheet, comprising: a first connecting portion, connected to a corresponding battery; and a second connecting portion, connected to one end of the first connecting portion and fixed to the extension portion of the end plate;
   wherein the second connecting portion of the output electrode connecting sheet is fixed to the extension portion of the end plate through a fastening assembly;
   the battery module further comprises: a current collecting plate, fixedly connected to the second connecting portion of the output electrode connecting sheet through the fastening assembly.
2. The battery module according to claim 1, wherein the second connecting portion extends downward in an up-down direction and is located on an outer side of the extension portion in the longitudinal direction.
3. The battery module according to claim 1, wherein the fastening assembly comprises: a connecting member; and a mating member, mated with the connecting member to fix the second connecting portion of the output electrode connecting sheet to the extension portion of the end plate.
4. The battery module according to claim 3, wherein
   the mating member is embedded in the extension portion of the end plate, and the mating member is provided with a connecting hole; and
   a head of the connecting member is located on an outer side of the second connecting portion of the output electrode connecting sheet in the longitudinal direction, and a tail of the connecting member is fixedly connected to the mating member through the connecting hole.
5. The battery module according to claim 4, wherein the mating member protrudes from the extension portion in the longitudinal direction, so that the second connecting portion of the output electrode connecting sheet abuts on an end face of the mating member.
6. The battery module according to claim 3, wherein an outer peripheral face of the mating member is provided with protrusions and/or grooves engaged with the extension portion.
7. The battery module according to claim 3, wherein
   the extension portion is provided with a restraint groove; and
   a head of the connecting member is fixed in the restraint groove, and a tail of the connecting member protrudes from the second connecting portion of the output electrode connecting sheet to be fixedly connected to the mating member.
8. The battery module according to claim 7, wherein the connecting member is a hexagon head bolt, and an inner peripheral face of the restraint groove is formed into a hexagon head shape.

* * * * *